US010387607B2

(12) United States Patent
De et al.

(10) Patent No.: US 10,387,607 B2
(45) Date of Patent: Aug. 20, 2019

(54) TEMPERATURE-DEPENDENT PRINTED CIRCUIT BOARD TRACE ANALYZER (71) Applicant: Cisco Technology, Inc., San Jose, CA (US)

(72) Inventors: Soumya De, Santa Clara, CA (US); Yaochao Yang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 134 days.

(21) Appl. No.: 15/237,179

(22) Filed: Aug. 15, 2016

(65) Prior Publication Data
US 2018/0046747 A1 Feb. 15, 2018

(51) Int. Cl.
G06F 17/50 (2006.01)
G01R 31/00 (2006.01)
G01R 31/28 (2006.01)

(52) U.S. Cl.
CPC ....... G06F 17/5081 (2013.01); G01R 31/281 (2013.01); G06F 17/5068 (2013.01); G06F 2217/80 (2013.01); G06F 2217/82 (2013.01); G06F 2217/84 (2013.01)

(58) Field of Classification Search
None
See application file for complete search history.

(56) References Cited

U.S. PATENT DOCUMENTS 5,781,446 A * 7/1998 Wu ................... G06F 17/5072
716/122
6,389,582 B1 * 5/2002 Valainis ............ G06F 17/5072
165/185
6,662,345 B2 * 12/2003 Uchida ............. G06F 17/5018
716/111
7,114,132 B2 * 9/2006 Yaguchi ........... G06F 17/5036
716/115
8,286,111 B2 * 10/2012 Chandra .......... G06F 17/5036
716/110
8,312,412 B2 * 11/2012 Tsujimura ........ G06F 17/5081
716/109

(Continued)

OTHER PUBLICATIONS

Microwave Journal, "Modeling a PCB's Thermal Behavior," Aug. 3, 2011, 2 pages.*

(Continued)

Primary Examiner — Leigh M Garbowski
(74) Attorney, Agent, or Firm — Patterson + Sheridan, LLP (57) ABSTRACT Techniques are disclosed to determine the temperature-dependent insertion loss and propagation delay of traces in a printed circuit board design. For example, an example method includes determining a first temperature at a first portion of a trace of a PCB design based on a thermal map of the PCB design. The method further includes determining a second temperature at a second portion of the trace based on the thermal map. The method further includes calculating a temperature-dependent property of the PCB at the first portion based on the first temperature. The method further includes calculating the temperature-dependent property of the PCB at the second portion based on the second temperature. The method further includes calculating at least one of a signal loss and propagation delay on the trace based on the temperature-dependent property of the PCB at the first portion and the second portion.

20 Claims, 5 Drawing Sheets (56) References Cited

U.S. PATENT DOCUMENTS

| | | | | |
|---|---|---|---|---|
| 8,836,073 | B1* | 9/2014 | Or-Bach | H01L 23/50 |
| | | | | 257/369 |
| 9,020,655 | B2* | 4/2015 | Brower | G06F 1/206 |
| | | | | 700/299 |
| 2009/0224356 | A1* | 9/2009 | Chandra | G06F 17/5009 |
| | | | | 257/499 |

OTHER PUBLICATIONS

K.-F. Fuh et al., "Wideband Extraction of DK and DF of Printed Circuit Boards Using Two Transmission Lines with Sufficient Length Difference," 2012 Prc. 7th Int'l Microsystems Packaging Assembly and Circuits Technology Conference (IMPACT), pp. 287-290.*

Y. Zhang et al., "A Thermal Model for the PCB Structure Including Thermal Contribution of Traces and Vias," EDA Publishing, THERMINIC 2012, 6 pages.*

G.V. Shankaran et al., "Orthotropic Thermal Conductivity and Joule Heating Effect on the Temperature Distribution of Printed Cirucit Boards," 2010 IEEE, 9 pages.*

Designcon 2012, "Temperature and Moisture Dependence of PCB and Package Traces and the Impact on Signal Performance," UBM Electronics, Feb. 1, 2012, 46 pages.

* cited by examiner

TEMPERATURE-DEPENDENT PRINTED CIRCUIT BOARD TRACE ANALYZER

TECHNICAL FIELD

Embodiments of the invention generally relate to techniques for estimating the temperature-dependent insertion loss and propagation delay of traces in a printed circuit board design. More specifically, embodiments presented herein are directed to determining the temperature-dependent insertion loss and propagation delay of traces in a printed circuit board design based on thermal analysis of the printed circuit board design.

BACKGROUND

Printed circuit board (PCB) designs may be used to mechanically support and electrically connect electronic components in a variety of applications. For example, PCBs may be utilized in almost all electronic devices, such as computing devices. The PCB may electrically connect the electronic components utilizing transmission lines (also referred to as "traces") that are formed (e.g., etched) on the PCB.

These electronic components of the electronic devices may require high-speed interfaces, and high-bandwidth (frequency) signals may be sent along the traces of the PCB between the electronic components. At these high frequencies, the insertion loss may be higher than at lower frequencies, making designing for such insertion loss important. In particular, insertion loss may be measured as the loss per inch (measured in dB) of a signal as it travels along the traces of the PCB. If the device is not properly designed to deal with the insertion loss, then the device may fail when operating. For example, the signal may become attenuated to the point it cannot be differentiated from noise on the trace.

In addition, the timing of when signals are sent and received between the electronic components on the PCB may also be important to the function of the device. For example, processing of signals may be based on a clock, such that if a signal is not properly aligned with the clock, the signal may be interpreted incorrectly. Accordingly, the propagation delay, i.e., the time it takes for the signal to travel along the traces, may need to meet certain requirements and/or the device may need to be designed according to strict propagation delays.

Therefore, precise analysis of PCB traces may be important to ensure that the electronic device operates within particular operating margins. In particular, estimating the insertion loss and propagation delay of traces on a PCB of a particular electronic device may be important for design optimization, channel budgeting, ensuring optimized equalization settings of the transmitter and receiver in multi-gigabit advanced modulation interfaces, etc.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented herein provides a method for determining temperature-dependent properties in a printed circuit board (PCB) design. The method includes determining a first temperature at a first portion of a trace of a PCB design based on a thermal map of the PCB design. The thermal map is based on a thermal analysis of the PCB design. The method further includes determining a second temperature at a second portion of the trace based on the thermal map, the second temperature being different than the first temperature. The method further includes calculating a temperature-dependent property of the PCB at the first portion based on the first temperature. The method further includes calculating the temperature-dependent property of the PCB at the second portion based on the second temperature. The method further includes calculating at least one of a signal loss and propagation delay on the trace based on the temperature-dependent property of the PCB at the first portion and the second portion.

Another embodiment presented herein provides a computing device for determining temperature-dependent properties in a printed circuit board (PCB) design. The computing device includes a memory and a processor. The processor is configured to determine a first temperature at a first portion of a trace of a PCB design based on a thermal map of the PCB design. The thermal map is based on a thermal analysis of the PCB design. The processor is further configured to determine a second temperature at a second portion of the trace based on the thermal map, the second temperature being different than the first temperature. The processor is further configured to calculate a temperature-dependent property of the PCB at the first portion based on the first temperature. The processor is further configured to calculate the temperature-dependent property of the PCB at the second portion based on the second temperature. The processor is further configured to calculate at least one of a signal loss and propagation delay on the trace based on the temperature-dependent property of the PCB at the first portion and the second portion.

Another embodiment presented herein provides a computing device for determining temperature-dependent properties in a printed circuit board (PCB) design. The computing device includes means for determining a first temperature at a first portion of a trace of a PCB design based on a thermal map of the PCB design. The thermal map is based on a thermal analysis of the PCB design. The computing device further includes means for determining a second temperature at a second portion of the trace based on the thermal map, the second temperature being different than the first temperature. The computing device further includes means for calculating a temperature-dependent property of the PCB at the first portion based on the first temperature. The computing device further includes means for calculating the temperature-dependent property of the PCB at the second portion based on the second temperature. The computing device further includes means for calculating at least one of a signal loss and propagation delay on the trace based on the temperature-dependent property of the PCB at the first portion and the second portion.

Another embodiment presented herein provides a computer-readable medium comprising instructions that when executed by a computing device cause the computing device to perform a method for determining temperature-dependent properties in a printed circuit board (PCB) design. The method includes determining a first temperature at a first portion of a trace of a PCB design based on a thermal map of the PCB design. The thermal map is based on a thermal analysis of the PCB design. The method further includes determining a second temperature at a second portion of the trace based on the thermal map, the second temperature being different than the first temperature. The method further includes calculating a temperature-dependent property of the PCB at the first portion based on the first temperature. The method further includes calculating the temperature-dependent property of the PCB at the second portion based on the second temperature. The method further includes calculating at least one of a signal loss and propagation delay on the trace based on the temperature-dependent property of the PCB at the first portion and the second portion.

Example Embodiments

Embodiments presented herein provide techniques to estimate temperature-dependent properties in a printed circuit board (PCB) design. Certain embodiments presented herein provide techniques for determining the temperature-dependent insertion loss and propagation delay of traces in a PCB design based on thermal analysis of the PCB.

PCBs for electronic devices may include a number of components (e.g., integrated circuits) which may be mounted (e.g., surface mounted) on the PCB. These components may be placed in different locations on the PCB for different PCB designs. Further, these components, when operating, may generate varying temperatures. Accordingly, depending on which components are included in the PCB, where they are located, and how a cooling system is designed for the PCB, the temperature of the PCB when operating may be varied across the geometry of the PCB.

Figure 1:
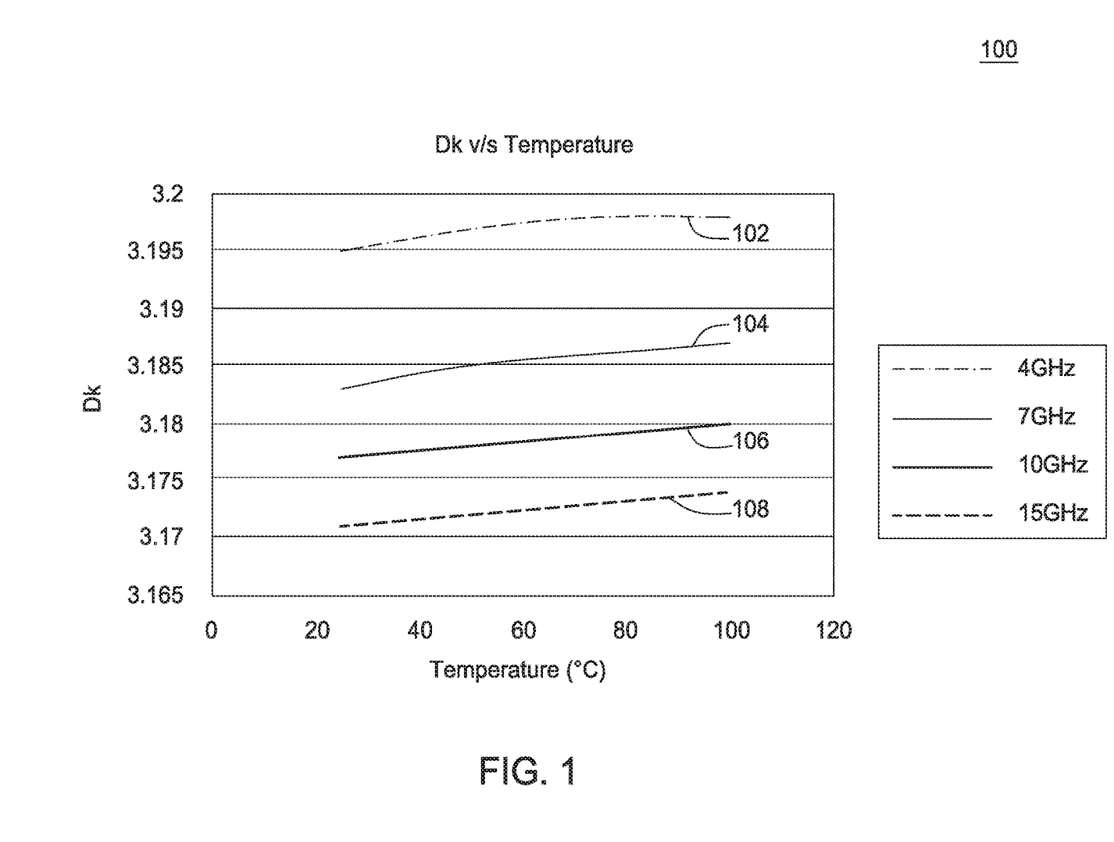
FIG. 1 illustrates a graph of the dielectric constant value based on the temperature of an example PCB, according to one embodiment.

In addition, the electrical properties (e.g., dielectric constant (Dk), dielectric dissipation factor (Df), etc.) of the materials the PCB is made of may vary with temperature significantly. For example, as shown in the graph 100 of FIG. 1, the dielectric constant (Dk) of the PCB material varies based on the temperature of the PCB material. The Dk may further depend on the frequency of the signals carried by the PCB. In particular, the graph 100 shows plots 102, 104, 106, and 108 of Dk vs temperature for an example PCB material of a PCB carrying signals at frequencies of 4 GHz, 7 GHz, 10 GHz, and 15 GHz, respectively.

Figure 2:
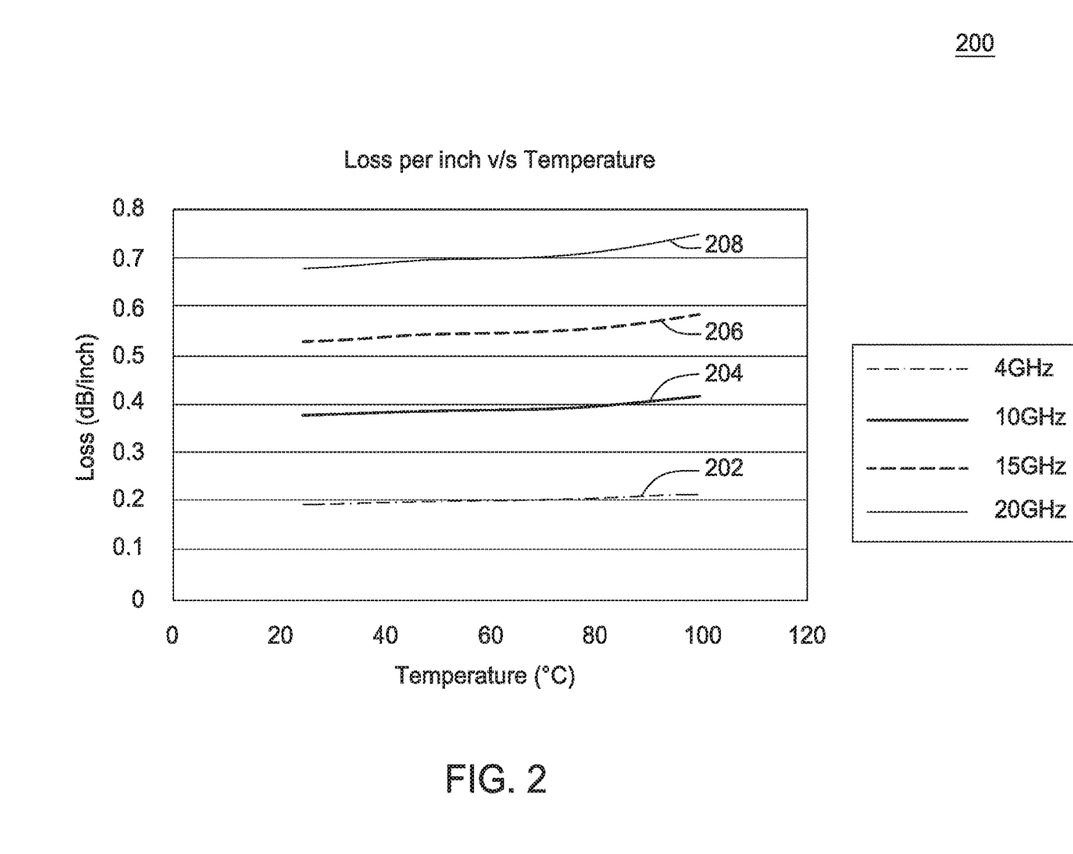
FIG. 2 illustrates a graph of the insertion loss per inch based on the temperature of an example PCB, according to one embodiment.

Further, the electrical properties of the PCB materials affect the operation of the traces on the PCB. For example, the insertion loss and propagation delay along the traces may be based on the electrical properties of the PCB materials and therefore vary based on the temperature of the PCB. The insertion loss and propagation delay may further depend on the frequency of the signals carried by the traces of the PCB. For example, as shown in the graph 200 of FIG. 2, the insertion loss per inch (measured in dB of a trace may vary based on the temperature of the PCB. In particular, the graph 200 shows plots 202, 204, 206, and 208 of insertion loss vs temperature for an example trace on a PCB carrying signals at frequencies of 4 GHz, 10 GHz, 15 GHz, and 20 GHz, respectively.

Therefore, since the temperature may vary across the geometry of the PCB when it is operating, and the operation (e.g., propagation delay, insertion loss, etc.) of any traces routed on the PCB may vary based on temperature, the overall operation of the traces may vary significantly depending on where they are located on the PCB, and the design of the PCB. Further, as discussed, the operation of the traces may be important for design optimization, channel budgeting, ensuring optimized equalization settings of the transmitter and receiver in multi-gigabit advanced modulation interfaces, etc. Accordingly, techniques are described herein for determining the temperature-dependent insertion loss and propagation delay of traces in a PCB design based on thermal analysis of the PCB.

The techniques described herein may provide several advantages over other possible PCB design techniques. In particular, in other PCB design techniques, the temperature-dependent insertion loss and propagation delay of traces may only be measured after the PCB is manufactured, such as by placing the physical PCB in a temperature chamber and observing the variation of the losses and delays with temperature. Accordingly, if a failure resulting in excessive insertion loss or excessive propagation delay is found in the PCB based on the operating temperature of the PCB, the entire PCB may need to be redesigned and manufactured, thereby adding significant cost and time to the design of an electronic device.

Further, other techniques may utilize software tools to try and estimate the temperature-dependent insertion loss and propagation delay of traces on a PCB based on the temperature-dependent dielectric properties (Df, Dk) of the materials of the PCB and a uniform estimated temperature value for the PCB. For example, the software tools may determine a minimum and maximum temperature-dependent insertion loss and propagation delay of traces of a PCB based on an expected minimum and maximum temperature the PCB may operate under. Such methods, however, may be inaccurate as they cannot account for insertion loss and propagation delay due to variations in the temperature across the geometry of the PCB prior to production of the PCB. In other words, the location-dependent temperature variation of the electrical properties of a PCB cannot be estimated. Accordingly, though the PCB design may be estimated to meet particular operating margins based on the estimated minimum and maximum temperature-dependent insertion loss and propagation delay, the actual PCB created from the design may still fail.

Certain embodiments herein provide a computer-implemented method to estimate the temperature across the geometry of the PCB design. In some embodiments, the temperature across the geometry of the PCB design may be estimated by a computing device based on the estimated ambient temperature the PCB operates in, the estimated temperature of components on the PCB when operating at expected conditions (load, frequency, voltage, etc.), the estimated cooling applied to the PCB design by active and/or passive cooling elements in the electronic device that includes the PCB design, etc. For example, the computing device may perform a thermal analysis (e.g., utilizing PCB thermal analysis techniques such as those based on computational fluid dynamics) of the PCB design based on one or more of these factors and generate a thermal map of the PCB design. For example, the thermal map may indicate the temperature at each point across the PCB design.

In some embodiments, the computing device estimates the temperature at different sections of the PCB design. For example, the computing device may divide the PCB design into a number of sections or regions that form a grid on the PCB design. In some embodiments, these sections may be isothermal sections. In particular, an isothermal section may refer to a contiguous area of the PCB design that has a similar temperature (e.g., within a threshold range above or below a temperature). In some embodiments, the sections may have the same size and shape (e.g., rectangular shape), or different sizes and shapes. In some embodiments, the size and/or shape of the sections is dependent on the complexity of the routing of traces in the PCB design and the accuracy desired for analyzing the traces. For example, where the PCB design has a more complex trace routing, the size of each section may be made smaller as the temperature variation may be greater over areas of the PCB design due to the complex trace routing. Further, if the PCB design has a less complex trace routing, the size of each section may be made larger as the temperature variation may be less over areas of the PCB design due to the simpler trace routing. Though smaller section sizes may lead to a more accurate trace analysis, larger section sizes may be used in certain circumstances, as the computational complexity to perform the trace analysis by the computing device may be greater as the section size decreases.

Figure 3:
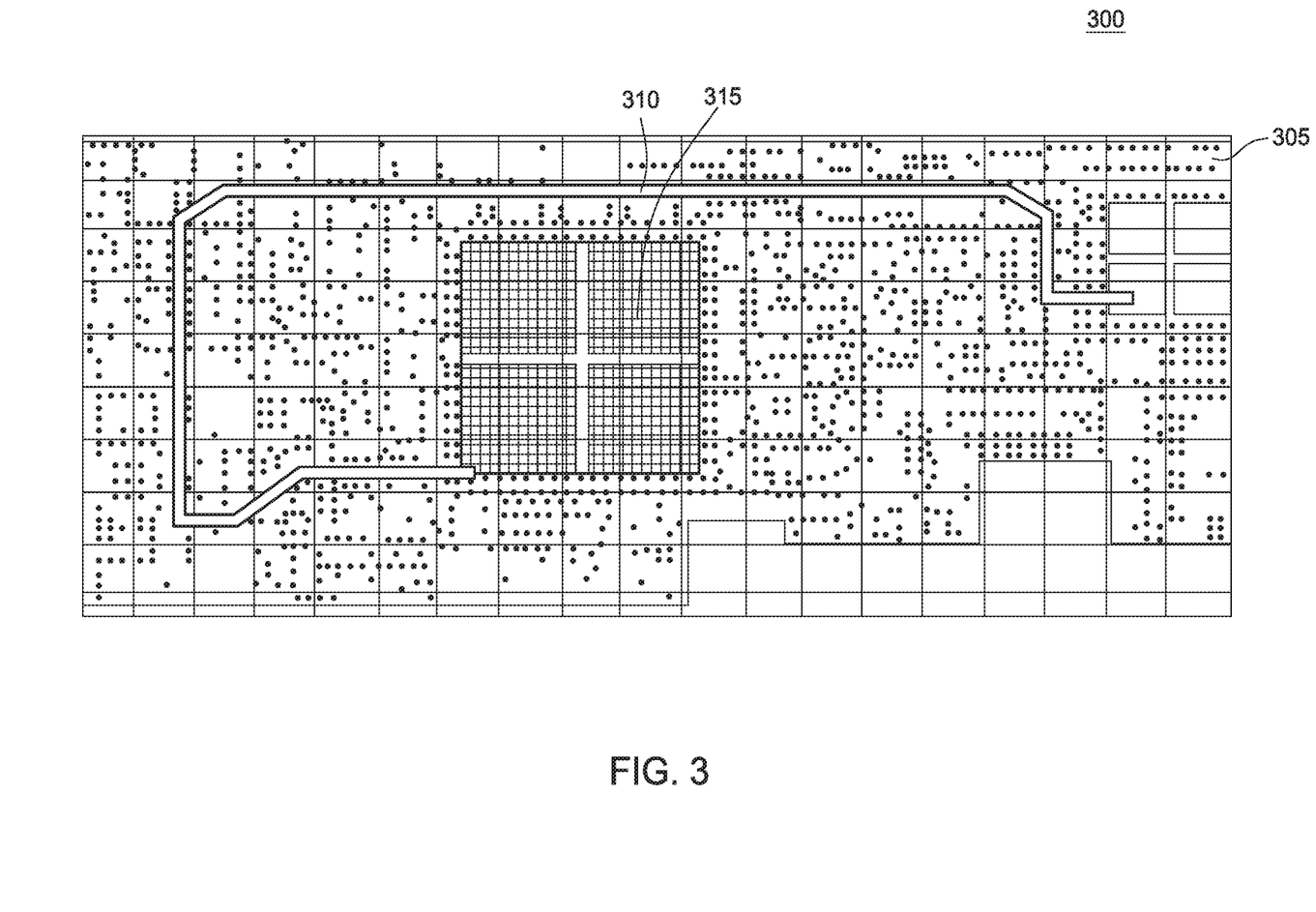
FIG. 3 illustrates an example of a PCB design, according to one embodiment.

FIG. 3 is an example of a PCB design 300 divided into sections 305 forming a grid. The PCB design 300, as shown, includes a number of traces including trace 310. The trace 310, as shown, passes through multiple sections 305. Further, the PCB design 300 includes various components 315.

The temperature of a given section 305 of the PCB design 300 may be calculated based on a thermal map generated by a temperature estimation technique or algorithm, such as, those based on computational fluid dynamics. For example, the temperature at a particular section 305 of the PCB design 300 may be calculated by the computing device based on the estimated ambient temperature the PCB operates in, the estimated temperature of components on the PCB when operating at expected conditions (load, frequency, voltage, etc.), the estimated cooling applied to the PCB design 300 by active and/or passive cooling elements in the electronic device that includes the PCB design 300, etc. For example, as discussed herein, the computing device may generate a thermal map of the PCB design 300. Further, the temperature of a given section 305 of the PCB design 300 may be calculated as the average temperature in the given section 305 based on the temperatures in the thermal map of the PCB design 300. Accordingly, the computing device may calculate the temperature at each section 305 of the PCB design 300.

Further, the computing device may, for each trace, calculate the insertion loss and propagation line of the trace over each section 305 the trace is located. For example, the trace 310 may pass through a number of sections 305. The temperature at each section 305 may be calculated as discussed. Further, the temperature-dependent electrical properties (e.g., Df, Dk) of the PCB design 300 may be known at a number of different temperatures (e.g., obtained from a vendor of the PCB and stored in the computing device). Therefore, the electrical properties (e.g., Df, Dk) at each section 305 may be determined based on the temperature of the section 305. Utilizing the electrical properties of each section 305, the computing device may calculate the scattering parameters (e.g., elements of a scattering matrix) of the trace 310 within that section 305 (e.g., using equations such as Maxwell's Equations, Telegrapher's Equations, or in general, Lossy Transmission Line Equations). Examples of equations that may be used to calculate the scattering parameters are described in *Microwave Engineering, $3^{rd}$ Edition*, David M. Pozar and *Advanced Signal Integrity for High-Speed Digital Designs*, Stephen H. Hall, Howard L. Heck, each of which are hereby incorporated by reference. Scattering parameters may describe the electrical behavior of linear electrical networks when undergoing various steady state stimuli by electrical signals. For example, the scattering parameters may express the gain, return loss, insertion loss, etc. of a linear electrical network. Accordingly, the scattering parameters of the trace 310 may be used to describe the electrical behavior of the trace 310 when operating to pass signals between components such as the insertion loss and propagation delay of the trace 310 in each section 305. In particular, certain scattering parameters or its derivatives may be equal to the insertion loss and propagation delay. For the trace 310, the insertion losses and propagation delays in each section 305 the trace 310 is located may be cascaded together (e.g., summed) by the computing device to determine the overall insertion loss and propagation delay for the trace 310.

Thus, the insertion loss and propagation delay for each trace of a PCB design can be accurately determined in view of the temperature variation across the PCB design. These insertion losses and propagation delays may be utilized to design an electronic device including a PCB that is less likely to fail when tested. For example, the tuning parameters (e.g., parameters for the bus on the PCB, components on the PCB, trace width, etc.) for the design of the entire electronic device including the PCB may be adjusted more accurately while still at the PCB design stage and without requiring the actual PCB to be manufactured. Accordingly, the computing device may further be configured to adjust the tuning parameters for the electronic device based on the calculated insertion loss and propagation delay for each trace of the PCB design. The computing device may iteratively adjust such tuning parameters and determine insertion loss and propagation delay for each trace of the PCB design, until the PCB design is determined to operate within defined operating margins. Additionally, by determining the insertion loss and propagation delay for each trace of the PCB design before manufacture, over design of the PCB can also be prevented, where the propagation delays and insertion losses are unnecessarily below the defined operating margins. Accordingly, the cost of the PCB design may be lower, while still meeting the defined operating margins.

Figure 4:
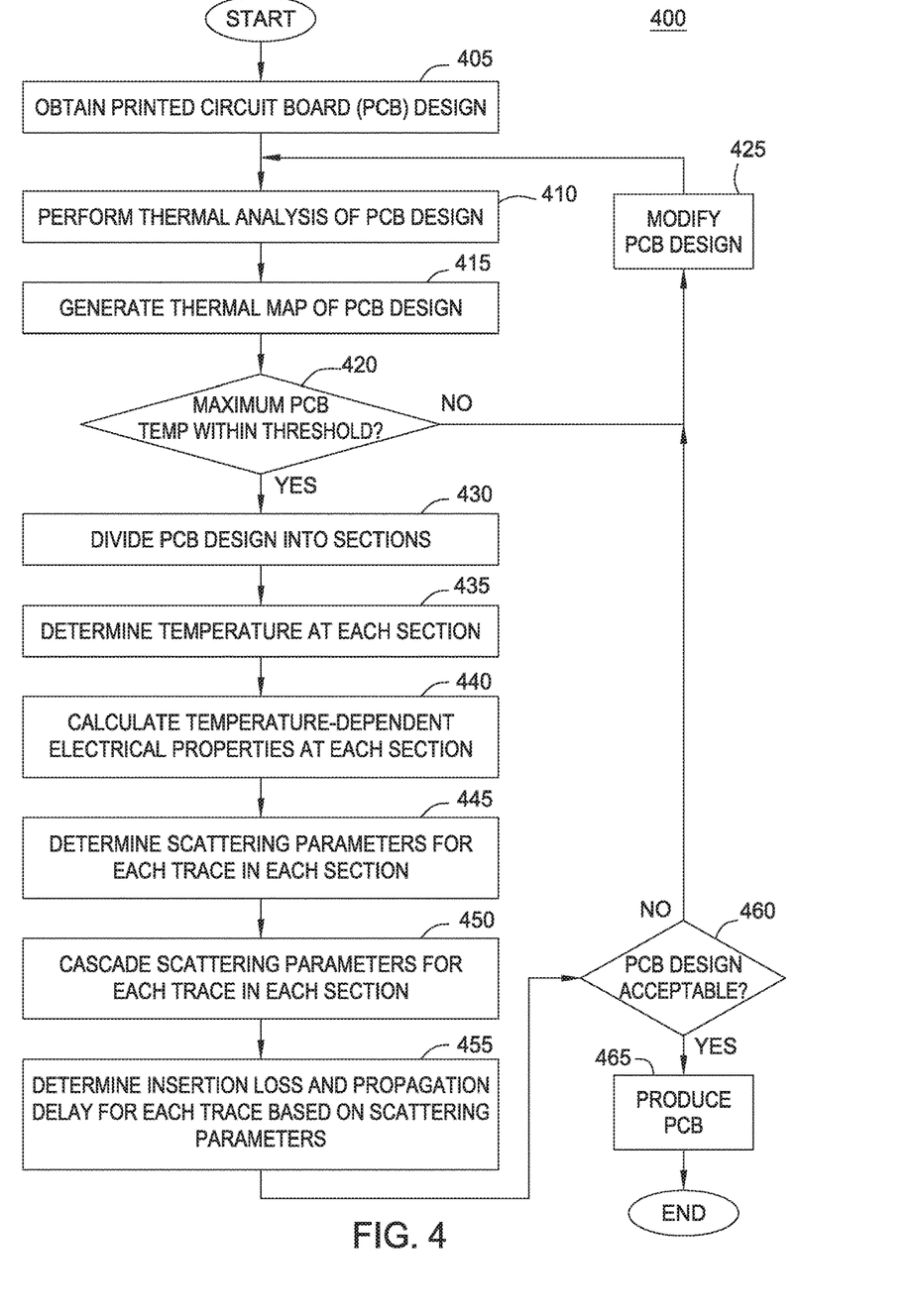
FIG. 4 illustrates a method of determining the temperature-dependent insertion loss and propagation delay of traces in a PCB design based on thermal analysis of the PCB, according to one embodiment.

FIG. 4 illustrates a method of determining the temperature-dependent insertion loss and propagation delay of traces in a PCB design based on thermal analysis of the PCB, according to one embodiment. As shown, the method 400 begins at 405 where a PCB design is obtained at a computing device. For example, the PCB design may be created by a user (e.g., on the computing device or on another computing device) and transferred/stored to the computing device.

At 410, the computing device may perform a thermal analysis of the PCB design. For example, as discussed, the temperature across the geometry of the PCB design may be estimated by the computing device based on the estimated ambient temperature the PCB operates in, the estimated temperature of components on the PCB when operating at expected conditions (load, frequency, voltage, etc.), the estimated cooling applied to the PCB design by active and/or passive cooling elements in the electronic device that includes the PCB design, etc. The computing device may perform such thermal analysis utilizing PCB thermal analysis techniques such as those based on computational fluid dynamics.

Continuing, at 415, the computing device may generate a thermal map of the PCB design that may indicate the temperature at each point across the PCB design based on the thermal analysis. At 420, the computing device may determine whether the maximum temperature indicated by the thermal map of the PCB design is within a threshold temperature (e.g., based on operating conditions of the components of the PCB design) for the PCB design. If at 420, the computing device determines the maximum temperature is not within the threshold temperature, the method 400 may proceed to a step 425. At 425, the PCB design may be changed, such as manually by a user of the computing device, or automatically by the computing device. The method 400 may then return to the step 410.

If at 420, the computing device determines the maximum temperature is within the threshold temperature, the method 400 may proceed to a step 430. At 430, the computing device may divide the PCB design into a number of sections (meshes) forming a grid. In some embodiments, the sections may comprise square or rectangular shaped sections. Further, in some embodiments, the size of the sections may be selected by a user of the computing device. For example, the user of the computing device may select the size based on a complexity of the PCB design and/or desired accuracy of trace analysis of the PCB design.

At 435, the computing device may determine the temperature at each section of the PCB design. For example, the computing device may calculate the temperature at each section of the PCB design based on the generated thermal map. The temperature at each section of the PCB design may be calculated as the average temperature in the section according to the generated thermal map.

At 440, the computing device may calculate the temperature-dependent electrical properties (e.g., Df, Dk) of the PCB design at each section of the PCB design. For example, the temperature-dependent electrical properties may be known (e.g., provided by a vendor of the PCB) for a number of temperatures, and stored at the computing device. For each section, the computing device may look up the electrical properties at the temperature of the section, and associate the section with the determined electrical properties.

At 445, the computing device may, for each trace of the PCB design, determine the scattering parameters for each section a portion of the trace is in based on the electrical properties of the section. For example, the computing device may calculate the scattering parameters of each trace within each section using equations such as Maxwell's Equations, Telegrapher's Equations, or in general, Lossy Transmission Line Equations.

At 450, for each trace of the PCB design, the computing device may cascade (e.g. sum) the scattering parameters over each section a portion of the trace is in. At 455, the computing device, for each trace of the PCB design, may determine the insertion loss and propagation delay based on the scattering parameters associated with the trace. In particular, certain scattering parameters or its derivatives may equal the insertion loss and propagation delay.

At 460, the computing device may determine whether the insertion losses and propagation delays for the PCB design are acceptable (e.g., within a threshold). For example, the user may set a threshold insertion loss and/or propagation delay.

If at 460, it is determined that either the insertion losses or propagation delay for the PCB design is unacceptable, the process returns to 425. If at 460, it is determined that the insertion losses and propagation delay for the PCB design are acceptable, the process continues to 465. At 465, the PCB may be produced based on the PCB design.

Figure 5:
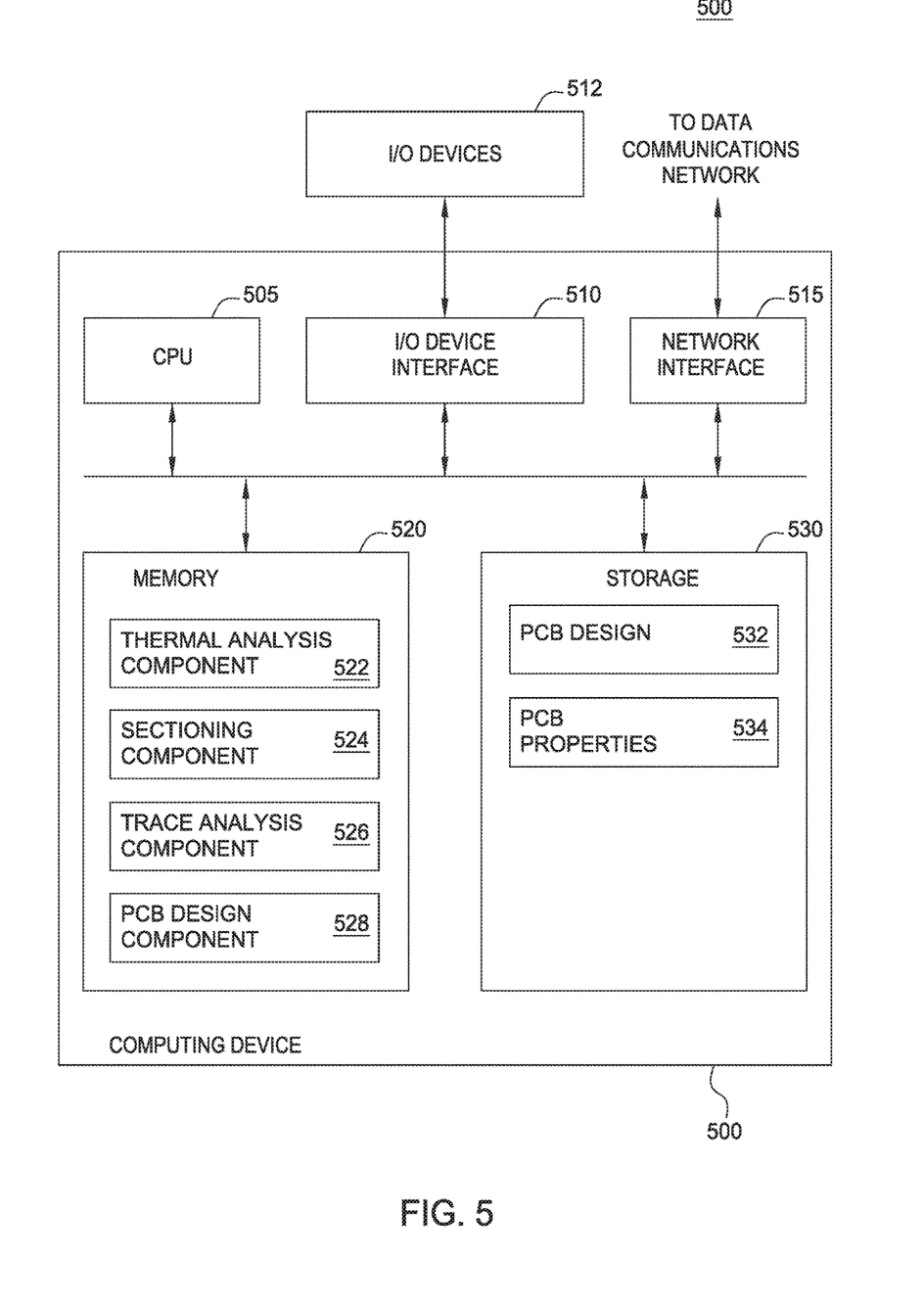
FIG. 5 illustrates an example computing system configured to determine the temperature-dependent insertion loss and propagation delay of traces in a PCB design based on thermal analysis of the PCB, according to one embodiment.

FIG. 5 illustrates an example computing system 500 configured to determine the temperature-dependent insertion loss and propagation delay of traces in a PCB design based on thermal analysis of the PCB, according to one embodiment. For example, the computing system 500 may be configured to perform the method 400. As shown, the computing system 500 includes, without limitation, a central processing unit (CPU) 505, a network interface 515, a memory 520, and storage 530, each connected to a bus 519. The computing system 500 may also include an I/O device interface 510 connecting I/O devices 512 (e.g., keyboard, display and mouse devices) to the computing system 500.

The CPU 505 retrieves and executes programming instructions stored in the memory 520 as well as stores and retrieves application data residing in the storage 530. The bus 519 is used to transmit programming instructions and application data between the CPU 505, I/O devices interface 510, storage 530, network interface 515, and memory 520. Note, CPU 505 is included to be representative of a single CPU, multiple CPUs, a single CPU having multiple processing cores, and the like. And the memory 520 is generally included to be representative of a random access memory. The storage 530 may be a disk drive storage device. Although shown as a single unit, the storage 530 may be a combination of fixed and/or removable storage devices, such as fixed disc drives, removable memory cards, optical storage, network attached storage (NAS), or a storage area-network.

Illustratively, the memory 520 includes a thermal analysis component 522, a sectioning component 524, a trace analysis component 526, and a PCB design component, which collectively or separately may be programming instructions executable on the CPU 505. The storage 530 includes a PCB design 532 and PCB properties 534, which collectively or separately may be application data.

The thermal analysis component 522 may be configured to perform a thermal analysis of a PCB design 532, and generate a thermal map, as described herein. For example, the thermal analysis component 522 may be configured to access the PCB design 532 in storage 530, and perform the steps 410 and 415 of method 400 described with respect to FIG. 4. The thermal analysis component 522 may further be configured to determine if a maximum temperature of the PCB design 532 is within a threshold (e.g., step 420 of method 400), and if not, the PCB design component 528 may modify the PCB design 532 (e.g., step 425 of method 400).

The sectioning component 524 may be configured to divide the PCB design 532 into sections (e.g., step 430 of method 400). Further, the thermal analysis component 522 may be configured to determine the temperature at each section (e.g., step 435 of method 400).

The trace analysis component 526 may be configured to determine a temperature dependent electrical property of the PCB design 532 at each section, and determine insertion loss and propagation delay for each trace of the PCB design 532 based on the determined temperature dependent electrical property of the PCB design 532 at each section. Further, the trace analysis component 526 may determine if the PCB design 532 is acceptable based on the determined insertion loss and propagation delay for each trace. For example, the trace analysis component 526 may be configured to perform steps 440-460 of method 400.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for producing a printed circuit board (PCB), the method comprising:
   receiving a PCB design comprising a trace;
   dividing the PCB design into a plurality of sections, wherein a first portion of the trace is within a first section of the plurality of sections, wherein a second portion of the trace is within a second section of the plurality of sections, and wherein dimensioning of the first portion and the second portion is selected based on a complexity of a routing of the trace;
   determining, using a thermal map of the PCB design, a first temperature at the first portion, wherein the thermal map is based on a thermal analysis of the PCB design;
   determining, using the thermal map, a second temperature at the second portion;
   calculating a first value of a temperature-dependent property of the PCB at the first portion based on the first temperature;
   calculating a second value of the temperature-dependent property of the PCB at the second portion based on the second temperature;
   calculating one or more electrical properties of the trace based on the first value and the second value of the temperature-dependent property, wherein the one or more electrical properties comprise at least one of a signal loss and a propagation delay of the trace; and
   producing the PCB using the PCB design when the one or more electrical properties are within a corresponding one or more threshold values.

2. The method of claim 1, further comprising:
   performing the thermal analysis of the PCB design; and
   generating the thermal map of the PCB design based on the thermal analysis.

3. The method of claim 1, further comprising:
   calculating a corresponding value of the temperature-dependent property of the PCB for each of the plurality of sections.

4. The method of claim 1, wherein the temperature-dependent property of the PCB comprises a dielectric constant of the PCB.

5. The method of claim 1, wherein calculating the one or more electrical properties of the trace comprises calculating scattering parameters of the first portion and the second portion.

6. The method of claim 5, wherein calculating the one or more electrical properties of the trace comprises cascading the calculated scattering parameters of the first portion and the second portion.

7. The method of claim 1, wherein a sizing of the first portion and the second portion is relatively smaller when the complexity of the routing is relatively more complex, and wherein the sizing of the first portion and the second portion is relatively greater when the complexity of the routing is relatively less complex.

8. The method of claim 1, wherein calculating the one or more electrical properties of the trace occurs as a first instance, the method further comprising:
   determining, responsive to the first instance, that the one or more electrical properties are not within the one or more threshold values;
   adjusting the PCB design;
   calculating, as a second instance, the one or more electrical properties of the trace for the adjusted PCB design; and
   determining, responsive to the second instance, that the one or more electrical properties of the trace for the adjusted PCB design.

9. A computing device comprising:
   a memory; and
   a processor configured to:
     receive a printed circuit board (PCB) design comprising a trace;
     divide the PCB design into a plurality of sections, wherein a first portion of the trace is within a first section of the plurality of sections, wherein a second portion of the trace is within a second section of the plurality of sections, and wherein dimensioning of the first portion and the second portion is selected based on a complexity of a routing of the trace;
     determine, using a thermal map of the PCB design, a first temperature at the first portion, wherein the thermal map is based on a thermal analysis of the PCB design;
     determine, using the thermal map, a second temperature at the second portion;
     calculate a first value of a temperature-dependent property of the PCB at the first portion based on the first temperature;
     calculate a second value of the temperature-dependent property of the PCB at the second portion based on the second temperature;
     calculate one or more electrical properties of the trace based on the first value and the second value of the temperature-dependent property, wherein the one or more electrical properties comprise at least one of a signal loss and a propagation delay of the trace;
     determine whether the one or more electrical properties are within a corresponding one or more threshold values; and
     when the one or more electrical properties are within the corresponding one or more threshold values, output one or more signals that cause production of the PCB using the PCB design.

10. The computing device of claim 9, wherein the processor is further configured to:
    perform the thermal analysis of the PCB design; and
    generate the thermal map of the PCB design based on the thermal analysis.

11. The computing device of claim 9, wherein the processor is further configured to:
    calculate a corresponding value of the temperature-dependent property of the PCB for each of the plurality of sections.

12. The computing device of claim 9, wherein the temperature-dependent property of the PCB comprises a dielectric constant of the PCB.

13. The computing device of claim 9, wherein to calculate the one or more electrical properties of the trace comprises to calculate scattering parameters of the first portion and the second portion.

14. The computing device of claim 13, wherein to calculate the one or more electrical properties of the trace comprises to cascade the calculated scattering parameters of the first portion and the second portion.

15. A computing device comprising:
a non-transitory means for receiving a printed circuit board (PCB) design comprising a trace;
a non-transitory means for dividing the PCB design into a plurality of sections, wherein a first portion of the trace is within a first section of the plurality of sections, wherein a second portion of the trace is within a second section of the plurality of sections, and wherein dimensioning of the first portion and the second portion is selected based on a complexity of a routing of the trace;
a non-transitory means for determining, using a thermal map of the PCB design, a first temperature at the first portion, wherein the thermal map is based on a thermal analysis of the PCB design;
a non-transitory means for determining, using the thermal map, a second temperature at the second portion;
a non-transitory means for calculating a first value of a temperature-dependent property of the PCB at the first portion based on the first temperature;
a non-transitory means for calculating a second value of the temperature-dependent property of the PCB at the second portion based on the second temperature;
a non-transitory means for calculating one or more electrical properties of the trace based on the first value and the second value of the temperature-dependent property, wherein the one or more electrical properties comprise at least one of a signal loss and a propagation delay of the trace;
a non-transitory means for determining whether the one or more electrical properties are within a corresponding one or more threshold values; and
a non-transitory means for, when the one or more electrical properties are within the corresponding one or more threshold values, outputting one or more signals that cause production of the PCB using the PCB design.

16. The computing device of claim 15, wherein the means for calculating one or more electrical properties of the trace comprises means for calculating scattering parameters of the first portion and the second portion.

17. The computing device of claim 16, wherein the means for calculating the one or more electrical properties of the trace comprises means for cascading the calculated scattering parameters of the first portion and the second portion.

18. A non-transitory computer-readable medium comprising instructions that when executed by a computing device cause the computing device to perform a method comprising:
receiving a PCB design comprising a trace;
dividing the PCB design into a plurality of sections, wherein a first portion of the trace is within a first section of the plurality of sections, wherein a second portion of the trace is within a second section of the plurality of sections, and wherein dimensioning of the first portion and the second portion is selected based on a complexity of a routing of the trace;
determining, using a thermal map of the PCB design, a first temperature at the first portion, wherein the thermal map is based on a thermal analysis of the PCB design;
determining, using the thermal map, a second temperature at the second portion,
calculating a first value of a temperature-dependent property of the PCB at the first portion based on the first temperature;
calculating a second value of the temperature-dependent property of the PCB at the second portion based on the second temperature;
calculating one or more electrical properties of the trace based on the first value and the second value of the temperature-dependent property, wherein the one or more electrical properties comprise at least one of a signal loss and a propagation delay of the trace;
determining whether the one or more electrical properties are within a corresponding one or more threshold values; and
when the one or more electrical properties are within the corresponding one or more threshold values, outputting one or more signals that cause production of the PCB using the PCB design.

19. The computer-readable medium of claim 18, wherein calculating the one or more electrical properties of the trace comprises calculating scattering parameters of the first portion and the second portion.

20. The computer-readable medium of claim 19, wherein calculating the one or more electrical properties of the trace comprises cascading the calculated scattering parameters of the first portion and the second portion.

* * * * *